US008792309B2

(12) United States Patent
Xu

(10) Patent No.: US 8,792,309 B2
(45) Date of Patent: Jul. 29, 2014

(54) ALARM METHOD AND DEVICE

(71) Applicant: Huawei Device Co., Ltd., Shenzhen (CN)

(72) Inventor: Jianhua Xu, Shanghai (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 13/728,694

(22) Filed: Dec. 27, 2012

(65) Prior Publication Data

US 2013/0114382 A1 May 9, 2013

Related U.S. Application Data

(63) Continuation of application No. PCT/CN2011/076094, filed on Jun. 22, 2011.

(51) Int. Cl.
*G04B 23/06* (2006.01)

(52) U.S. Cl.
USPC ......................................................... 368/246

(58) Field of Classification Search
CPC ........ G04B 23/10; G04B 23/06; G04B 21/02; G04G 13/026; H04M 1/72566; G04C 21/30
USPC ............................. 368/246, 73, 250, 263, 245
See application file for complete search history.

(56) References Cited

U.S. PATENT DOCUMENTS

| | | | | |
|---|---|---|---|---|
| 5,995,455 | A * | 11/1999 | Kutosky | 368/73 |
| 8,406,817 | B2 * | 3/2013 | Logan et al. | 455/566 |
| 2003/0142591 | A1 * | 7/2003 | Baweja et al. | 368/263 |
| 2007/0297292 | A1 * | 12/2007 | Kraft et al. | 368/73 |
| 2008/0259742 | A1 | 10/2008 | Tadanori | |
| 2009/0231964 | A1 | 9/2009 | Kraft et al. | |
| 2012/0005612 | A1 | 1/2012 | Huang | |

FOREIGN PATENT DOCUMENTS

| | | | |
|---|---|---|---|
| CN | 101295165 | A | 10/2008 |
| CN | 101370196 | A | 2/2009 |
| CN | 101408751 | A | 4/2009 |
| CN | 101571710 | A | 11/2009 |
| CN | 101635770 | A | 1/2010 |

(Continued)

OTHER PUBLICATIONS

Office Action issued in corresponding Chinese Patent Application No. 201180000991.8, mailed Jul. 1, 2013, 11 pages.

(Continued)

*Primary Examiner* — Edwin A. Leon
(74) *Attorney, Agent, or Firm* — Brinks Gilson & Lione

(57) ABSTRACT

The present invention discloses an alarm method and device, and belongs to the electronic product field. The method includes: playing a first-time alarm clock ring when an alarm clock is triggered for a first time; and playing a delay alarm clock ring when the alarm clock is triggered again after a period of delay time. The device includes: a first play module and a second play module. According to the present invention, when the alarm clock rings, even if a user is in a doze state, the user is still able to determine whether the current ring is the first-time ring or the delay ring according to the different rings of the alarm clock, and then knows whether it is time to get up, thereby ensuring that the user is able to get up at the right time, and improving the user experience.

15 Claims, 3 Drawing Sheets

(56) References Cited

FOREIGN PATENT DOCUMENTS

| | | |
|---|---|---|
| CN | 101702744 A | 5/2010 |
| CN | 101707639 A | 5/2010 |
| CN | 101951435 A | 1/2011 |
| CN | 201887840 U | 6/2011 |
| CN | 102340593 A | 2/2012 |
| GB | 2296346 A | 6/1996 |
| JP | 60247190 A | 12/1985 |
| WO | WO 2007/148180 A1 | 12/2007 |

OTHER PUBLICATIONS

International Search Report issued in corresponding PCT Patent Application No. PCT/CN2011/076094, mailed Mar. 29, 2012.
Office Action issued in corresponding Chinese Patent Application No. 201180000991.8, mailed Jan. 10, 2013.
Extended European Search Report issued in corresponding European Patent Application No. 11789259.6, mailed Jun. 26, 2013, 7 pages.

* cited by examiner

ALARM METHOD AND DEVICE

CROSS-REFERENCE TO RELATED APPLICATIONS

This application is a continuation of International Application No. PCT/CN2011/076094, filed on Jun. 22, 2011, which is hereby incorporated by reference in its entirety.

FIELD OF THE INVENTION

The present invention relates to an electronic product field, and in particular, to an alarm method and a device.

BACKGROUND OF THE INVENTION

Because most mobile phones now provide an alarm clock function, people seldom use a traditional clock to set the alarm clock, but use mobile phones to set the alarm clock more often. After a user sets the ring time and an alarm clock ring for the alarm clock on a mobile phone, the alarm clock ring is played when the ring time arrives. At present, the alarm clocks of most mobile phones further support a delay function, that is, when an alarm clock rings for the first time, if the user does not choose to stop, the alarm clock will ring again when the period of delay time arrives. An alarm clock may be delayed for multiple times till the user chooses to stop.

When developing the present invention, the inventor finds at least the following drawbacks of the prior art:

Only one alarm clock ring is allowed on a current mobile phone. That is, the ring played for the first time is the same as the ring played after the period of delay time, which is monotonous for a user.

SUMMARY OF THE INVENTION

To solve the problem in the prior art, embodiments of the present invention provide an alarm method and a device. The technical solution is as follows:

In one aspect, an alarm method is provided. The method includes:

playing a first-time alarm clock ring when an alarm clock is triggered for a first time; and playing a delay alarm clock ring when the alarm clock is triggered again after a period of delay time.

In another aspect, an alarm device is provided. The device includes:

a first play module, configured to play a first-time alarm clock ring when an alarm clock is triggered for a first time; and a second play module, configured to play a delay alarm clock ring when the alarm clock is triggered again after a period of delay time.

Beneficial effects of the technical solutions provided in the embodiments of the present invention are:

By separately setting a first-time alarm clock ring and a delay alarm clock ring, the first-time alarm clock ring is played when the alarm clock is triggered for the first time, and the delay alarm clock ring is played when the alarm clock is triggered again, so when the alarm clock rings, even if a user is in a doze state, the user is still able to determine whether the current ring is the first-time ring or the delay ring according to the different rings of the alarm clock, and then knows whether it is time to get up, thereby ensuring that the user is able to get up at the right time, and improving the user experience.

BRIEF DESCRIPTION OF THE DRAWINGS

To better illustrate the present invention or technical solution, the drawings that need to be used in the present invention are presented in embodiments of the present invention. It is understandable that the drawings merely provide several applications of the present invention. Those skilled in the art are able to obtain other drawings based on these drawings without creative efforts.

DETAILED DESCRIPTION OF THE EMBODIMENTS

To make the purpose, technical solutions, and advantages of the present invention more clear, the following further describes embodiments of the present invention by combining corresponding drawings.

Embodiment 1

Figure 1:
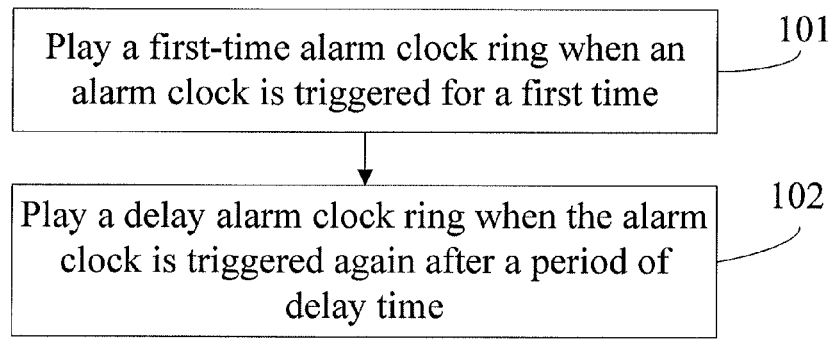
FIG. 1 is a flowchart of an alarm method according to a first embodiment of the present invention.

An embodiment of the present invention provides an alarm method to pre-save a first-time alarm clock ring and a delay alarm clock ring set by a user. As shown in FIG. 1, the method flow includes the following steps:

101: Play a first-time alarm clock ring when an alarm clock is triggered for a first time.

102: Play a delay alarm clock ring when the alarm clock is triggered again after a period of delay time.

According to the method provided in this embodiment of the present invention, by separately setting a first-time alarm clock ring and a delay alarm clock ring, playing the first-time alarm clock ring when the alarm clock is triggered for the first time, and playing the delay alarm clock ring when the alarm clock is triggered again, so when the alarm clock rings, even if a user is in a doze state, the user is still able to determine whether the current ring is the first-time ring or the delay ring according to the different rings of the alarm clock, and then knows whether it is time to get up, thereby ensuring that the user is able to get up at the right time, and improving the user experience.

Embodiment 2

Figure 2:
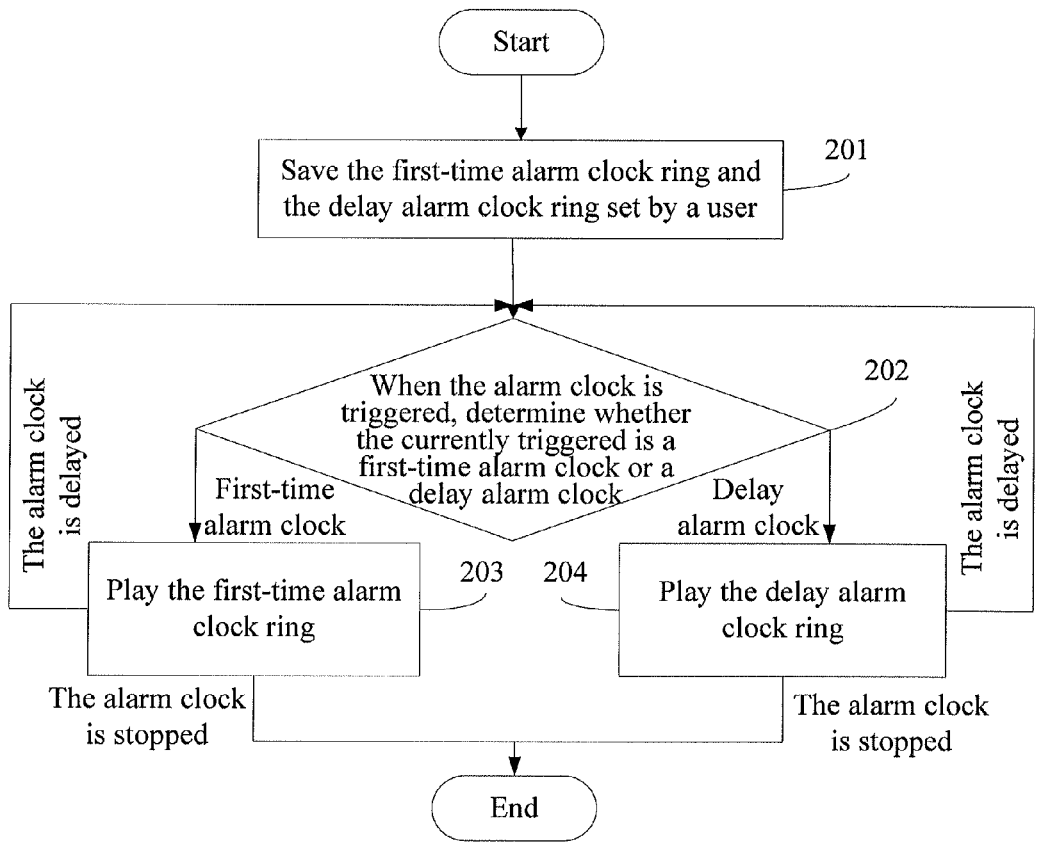
FIG. 2 is a flowchart of an alarm method according to a second embodiment of the present invention.

An embodiment of the present invention provides an alarm method that is applicable to an electronic device, such as a mobile phone and a PDA (Personal Digital Assistant, personal digital assistant), which provides an alarm clock function. This embodiment of the present invention describes the method by taking application of this method to a mobile phone as an example, but is not confined to this. As shown in FIG. 2, the method flow includes the following steps:

201: Save a first-time alarm clock ring and a delay alarm clock ring that are set by a user.

Specifically, when the user sets an alarm clock, the user may separately set the first-time alarm clock ring and the delay alarm clock ring, and is allowed to set them to the same rings or different rings. To achieve an effect of allowing the user to determine whether it is time to get up according to an alarm clock ring, this embodiment takes the case that the delay alarm clock ring is different from the first-time alarm clock ring as an example for description. If the saved delay alarm clock ring is the same as the first-time alarm clock ring, the user is reminded to modify the first-time alarm clock ring or the delay alarm clock ring.

For example, the user selects a ring setting from the setting menu of the alarm clock, and may select "111.MP3" as the first-time alarm clock ring and "222.MP3" as the delay alarm clock ring in the menu for ring setting. After the user completes selection, the mobile phone saves the rings set by the user. In addition, assume that the alarm clock ring time set by the user is 7:00.

Further, when the alarm clock is triggered for the first time, the first-time alarm clock ring is played; when the alarm clock is triggered again after a period of delay time, the delay alarm clock ring is played. For specific implementation methods, refer to steps 202, 203, and 204.

202: When the alarm clock is triggered, determine whether the currently triggered clock is a first-time alarm clock or a delay alarm clock; if it is the first-time alarm clock, go to step 203; if it is the delay alarm clock, go to step 204.

Specifically, when the alarm clock ring time set by the user arrives, the alarm clock is triggered for the first time. If the user does not choose to stop, but chooses to delay, the alarm clock is triggered again when the period of delay time arrives. The alarm clock ring time set by the user may be used as a first trigger condition. A mobile phone determines, according to the first trigger condition, that the alarm clock triggered at this time is the first-time alarm clock. The alarm clock ring time added with the period of delay time may be used as a second trigger condition. The mobile phone determines, according to the second trigger condition, that the alarm clock triggered at this time is the delay alarm clock. For example, assume that the alarm clock ring time set by the user is 7:00, and the period of delay time is 10 minutes. Then, when 7:00 arrives, the first-time alarm clock is triggered. After the user chooses to delay, when 7:10 arrives, the delay alarm clock is triggered. If the user continues to delay, when 7:20 arrives, the delay alarm clock is triggered again if the user does not stop the alarm clock.

203: If the first-time alarm clock is triggered, play the first-time alarm clock ring, and if the first-time alarm clock is stopped, the process ends; if the first-time alarm clock is delayed, go to step 202.

Specifically, when the currently triggered clock is the first-time alarm clock, the first-time alarm clock ring set by the user is played when the alarm clock is triggered. The following continues to use the examples in steps 201 and 202. The alarm clock ring time set by the user is 7:00. When the time reaches 7:00, the alarm clock rings, and the played ring is the first-time alarm clock ring "111.MP3". At this time, the user may either choose to stop the alarm clock, that is, shut it down so that it does not ring again, or choose to delay the alarm clock so that it rings again after a while, or the user does not perform any operation on the alarm clock so that it automatically delays. When the alarm clock rings again, the determining process in step 202 still needs to be executed.

204: If the delay alarm clock is triggered, play the delay alarm clock ring, and if the delay alarm clock is stopped, the process ends; if the delay alarm clock is delayed, go to step 202.

Specifically, if the currently triggered clock is the delay clock, the delay alarm clock ring set by the user is played when the alarm clock is triggered. If the delay alarm clock ring does not exist, or the user does not set the delay alarm clock ring, a default ring in the system of the mobile phone is played. The following continues to use the example in step 203. After the first-time alarm clock is delayed, when the time reaches 7:10, the alarm clock rings again, and the played ring is the delay alarm clock ring "222.MP3".

Alternatively, in the method provided in this embodiment of the present invention, when saving the delay alarm clock ring set by the user, may further, according to different numbers of alarm clock delay times, save the first delay alarm clock ring to the Nth delay alarm clock ring, where N is a positive integer. Accordingly, when the alarm clock is triggered again after an Nth delay time, the Nth delay alarm clock ring is played. For example, assume that the user generally delays the alarm clock three times before the user has to get up. Then the user may set the first delay alarm clock ring as "222.MP3", the second delay alarm clock ring as "333.MP3", and the third delay alarm clock ring as "444.MP3". When hearing the ring of "444.MP3", the user has to get up.

Alternatively, in the method provided in this embodiment of the present invention, when the delay alarm clock ring set by the user is saved, the first delay alarm clock ring to the Nth delay alarm clock ring may be further saved according to different preset periods of delay time, where N is a positive integer. Accordingly, when the alarm clock is triggered again after the Nth preset period of delay time, the Nth delay alarm clock ring is played. For example, the first preset period of delay time is 5 minutes, the corresponding first delay alarm clock ring is "222.MP3", the second preset period of delay time is 10 minutes, the corresponding second delay alarm clock ring is "333.MP3", the third preset period of delay time is 15 minutes, the corresponding third delay alarm clock ring is "444.MP3", and so on. Assume that the user sets the period of delay time of the alarm clock to the second preset period of delay time. Then, when the period of delay time arrives, the ring of "333.MP3" is played.

In the method provided in the embodiment, by separately setting the first-time alarm clock ring and delay alarm clock ring, the first-time alarm clock ring and delay alarm clock ring may be set to the same rings or to different rings, overcoming the drawback in the prior art where only one alarm clock ring may be set for a mobile phone, and improving user experience; if a user sets the first-time alarm clock ring and delay alarm clock ring to different rings, when the alarm clock rings, even if the user is in a doze state, the user is still able to determine whether the current ring is the first-time ring or the delay ring according to the different rings of the alarm clock, and then knows whether it is time to get up, thereby ensuring that the user is able to get up at the right time; in addition, the alarm clock ring in each delay may further be set to different rings so that the user is able to know more accurately how many times the alarm clock has ringed and whether the user has to get up.

Embodiment 3

Figure 3:
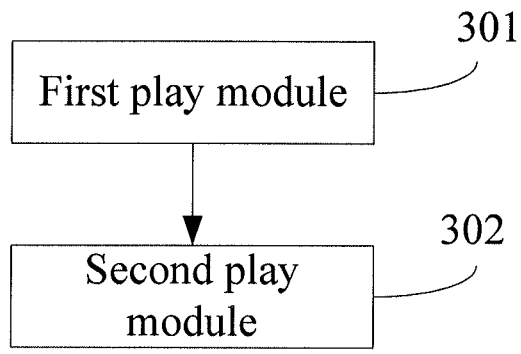
FIG. 3 is a structural schematic diagram of an alarm device according to a third embodiment of the present invention.

As shown in FIG. 3, an embodiment of the present invention provides an alarm device. This device may be applicable to an electronic device such as a mobile phone and a PDA which provides an alarm clock function. The device includes:

a first play module 301, configured to play a first-time alarm clock ring when an alarm clock is triggered for a first time; and a second play module 302, configured to play a delay alarm clock ring when the alarm clock is triggered again after a period of delay time.

Figure 4:
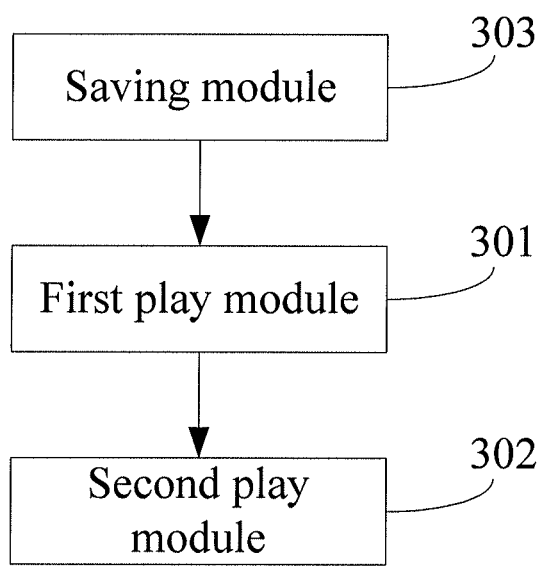
FIG. 4 is a structural schematic diagram of another alarm device according to the third embodiment of the present invention.

Further, as shown in FIG. 4, the device still includes:

a saving module 303, configured to: before the first play module 301 plays the first-time alarm clock ring, save the first-time alarm clock ring and the delay alarm clock ring that are set by a user.

Figure 5:
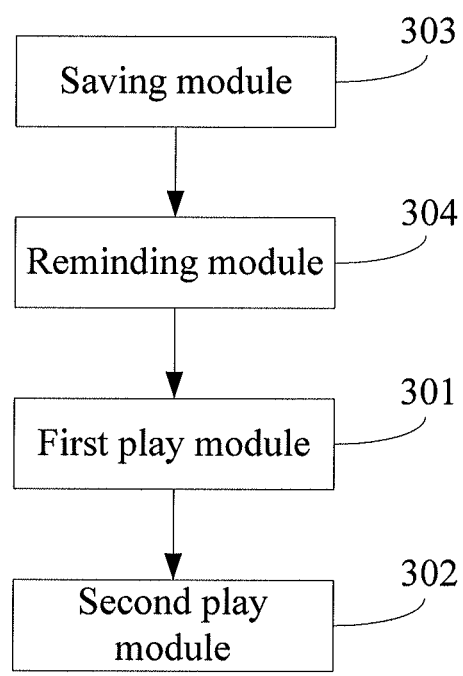
FIG. 5 is a structural schematic diagram of still another alarm device according to the third embodiment of the present invention.

The delay alarm clock ring and the first-time alarm clock ring that are saved by the saving module 303 may be different, or the same. If they are the same, as shown in FIG. 5, the device further includes:

a reminding module 304, configured to: when the delay alarm clock ring and the first-time alarm clock ring that are saved by the saving module 303 are the same, remind the user to modify the first-time alarm clock ring or the delay alarm clock ring. Certainly, if the user does not modify one of them, the user may also save the delay alarm clock ring and the first-time alarm clock ring as the same rings.

Further, when the second play module 302 plays the delay alarm clock ring, plays a default ring if the delay alarm clock ring does not exist.

Alternatively, when the saving module 303 is configured to save the delay alarm clock ring set by the user, the saving module 303 may be specifically configured to save the first delay alarm clock ring to the Nth delay alarm clock ring according to different numbers of alarm clock delay times, where N is a positive integer;

Accordingly, when the second play module 302 is configured to play the delay alarm clock ring when the alarm clock is triggered again after the period of delay time, the second play module 302 is specifically configured to play the Nth delay alarm clock ring when the alarm clock is triggered again after an Nth delay time.

Alternatively, when the saving module 303 is configured to save the delay alarm clock ring set by the user, the saving module 303 may further be specifically configured to save the first delay alarm clock ring to the Nth delay alarm clock ring according to different preset periods of delay time, where N is a positive integer;

Accordingly, when the second play module 302 is configured to play the delay alarm clock ring when the alarm clock is triggered again after the period of delay time, the second play module 302 may be specifically configured to play the Nth delay alarm clock ring when the alarm clock is triggered again after the Nth preset period of delay time.

To sum up, in this embodiment, by separately setting the first-time alarm clock ring and delay alarm clock ring, the first-time alarm clock ring and delay alarm clock ring may be set to the same rings or to different rings, overcoming the drawback in the prior art where only one alarm clock ring may be set for a mobile phone, and improving user experience; if a user sets the first-time alarm clock ring and delay alarm clock ring to different rings, when the alarm clock rings, even if the user is in a doze state, the user is still able to determine whether the current ring is the first-time ring or the delay ring according to the different rings of the alarm clock, and then knows whether it is time to get up, thereby ensuring that the user is able to get up at the right time; in addition, the alarm clock ring in each delay may further be set to different rings so that the user is able to know more accurately how many times the alarm clock has ringed and whether the user has to get up.

It should be noted that: when setting and playing the alarm clock ring, the alarm device provided in the preceding embodiment merely takes the preceding division of each functional module as an example for description. In actual applications, the preceding function distribution may be performed by different functional modules according to needs, that is, the internal structure of the device is divided into different functional modules to complete all or certain of the previously described functions. In addition, the alarm device provided in the preceding embodiment and alarm method embodiments belong to a same idea. For the details of the specific implementation process, refer to the method embodiments. The specific implementation process is not described herein again.

Sequence numbers of the preceding embodiments of the present invention are merely intended for description but do not imply preference to the embodiments.

All or certain steps in the embodiments of the present invention may be implemented by using hardware, or by using a program to instruct relevant hardware. The program may be stored in a readable storage medium, such as a compact disk and a hard disk.

The preceding embodiments are merely exemplary embodiments of the present invention, but are not intended to confine the present invention. The invention is intended to cover all the modifications, equivalent replacements, and improvements without departing from the spirit and principles of the invention.

What is claimed is:

1. An alarm method, comprising:
   playing a first-time alarm clock ring when an alarm clock is triggered for a first time;
   playing a delay alarm clock ring when the alarm clock is triggered again after a period of delay time; and
   reminding a user to modify the first-time alarm clock ring or the delay alarm clock ring in an alarm set up such that the first-time alarm clock ring to be saved would be different from the delay alarm clock ring to be saved.

2. The method according to claim 1, before the playing the first-time alarm clock ring, further comprising:
   saving the first-time alarm clock ring and the delay alarm clock ring that are set by a user.

3. The method according to claim 1, wherein, if the delay alarm clock ring does not exist when the delay alarm clock ring is played, playing a default ring.

4. The method according to claim 2, wherein the saving the delay alarm clock ring set by the user comprises:
   according to different numbers of alarm clock delay times, saving a first delay alarm clock ring to an Nth delay alarm clock ring, where N is a positive integer;
   accordingly, the playing the delay alarm clock ring when the alarm clock is triggered again after the period of delay time comprises:
   playing the Nth delay alarm clock ring when the alarm clock is triggered again after an Nth delay time.

5. The method according to claim 2, wherein the saving the delay alarm clock ring set by the user comprises:
   according to different preset periods of delay time, saving a first delay alarm clock ring to an Nth delay alarm clock ring, where N is a positive integer;
   accordingly, the playing the delay alarm clock ring when the alarm clock is triggered again the after the period of delay time comprises:
   playing the Nth delay alarm clock ring when the alarm clock is triggered again after an Nth preset period of delay time.

6. An alarm device, comprising:
   a first play module, configured to play a first-time alarm clock ring when an alarm clock is triggered for a first time;
   a second play module, configured to play a delay alarm clock ring when the alarm clock is triggered again after a period of delay time; and a reminding module, configured to remind a user to modify the first-time alarm clock ring or the delay alarm clock ring in an alarm set up, such that the first-time alarm clock ring to be saved would be different from the delay alarm clock ring to be saved.

7. The device according to claim 6, further comprising:
a saving module, configured to: before the first play module plays the first-time alarm clock ring, save the first-time alarm clock ring and the delay alarm clock ring that are set by a user.

8. The device according to claim 6, wherein, when playing the delay alarm clock ring, if the delay alarm clock ring does not exist, the second play module plays a default ring.

9. The device according to claim 7, wherein, when the saving module is configured to save the delay alarm clock ring set by the user, the saving module is specifically configured to save a first delay alarm clock ring to an Nth delay alarm clock ring according to differences between numbers of alarm clock delay times, where N is a positive integer;
accordingly, when the second play module is configured to play the delay alarm clock ring when the alarm clock is triggered again after the period of delay time, the second play module is specifically configured to, play the Nth delay alarm clock ring when the alarm clock is triggered again after an Nth delay time.

10. The device according to claim 7, wherein, when the saving module is configured to save the delay alarm clock ring set by the user, the saving module is specifically configured to save the first delay alarm clock ring to an Nth delay alarm clock ring according to different preset periods of delay time, where N is a positive integer;
accordingly, when the second play module is configured to play the delay alarm clock ring when the alarm clock is triggered again after the period of delay time, the second play module is specifically configured to play the Nth delay alarm clock ring when the alarm clock is triggered again after an Nth preset period of delay time.

11. A computer program product comprising a computer readable storage medium storing program code thereon for alarm, the program code comprising instructions for executing a method that comprises:
playing a first-time alarm clock ring when an alarm clock is triggered for a first time;
playing a delay alarm clock ring when the alarm clock is triggered again after a period of delay time; and
reminding a user to modify the first-time alarm clock ring or the delay alarm clock ring in an alarm set up such that the first-time alarm clock ring to be saved would be different from the delay alarm clock ring to be saved.

12. The computer program product according to claim 11, before the playing the first-time alarm clock ring, the method further comprising:
saving the first-time alarm clock ring and the delay alarm clock ring that are set by a user.

13. The computer program product according to claim 11, wherein, if the delay alarm clock ring does not exist when the delay alarm clock ring is played, playing a default ring.

14. The computer program product according to claim 12, wherein the saving the delay alarm clock ring set by the user comprises:
according to different numbers of alarm clock delay times, saving a first delay alarm clock ring to an Nth delay alarm clock ring, where N is a positive integer;
accordingly, the playing the delay alarm clock ring when the alarm clock is triggered again after the period of delay time comprises:
playing the Nth delay alarm clock ring when the alarm clock is triggered again after an Nth delay time.

15. The computer program product according to claim 12, wherein the saving the delay alarm clock ring set by the user comprises:
according to different preset periods of delay time, saving a first delay alarm clock ring to an Nth delay alarm clock ring, where N is a positive integer;
accordingly, the playing the delay alarm clock ring when the alarm clock is triggered again the after the period of delay time comprises:
playing the Nth delay alarm clock ring when the alarm clock is triggered again after an Nth preset period of delay time.

* * * * *